United States Patent
Lin (10) Patent No.: US 9,985,859 B2
(45) Date of Patent: May 29, 2018

(54) METHOD AND SYSTEM FOR MANAGING SERVERS

(71) Applicant: Tencent Technology (Shenzhen) Company Limited, Shenzhen (CN)

(72) Inventor: Li Lin, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 845 days.

(21) Appl. No.: 14/263,964

(22) Filed: Apr. 28, 2014

(65) Prior Publication Data

US 2014/0237114 A1 Aug. 21, 2014

Related U.S. Application Data

(63) Continuation of application No. PCT/CN2013/087369, filed on Nov. 19, 2013.

(30) Foreign Application Priority Data

Dec. 13, 2012 (CN) .......................... 2012 1 0538753

(51) Int. Cl.
*H04L 12/26* (2006.01)
*H04L 12/24* (2006.01)
(Continued)

(52) U.S. Cl.
CPC ........ *H04L 43/0876* (2013.01); *G06F 9/5055* (2013.01); *G06F 17/3007* (2013.01);
(Continued)

(58) Field of Classification Search
CPC .................................................. H04L 43/0876
(Continued)

(56) References Cited

U.S. PATENT DOCUMENTS

| 7,219,160 B1 | 5/2007 | Buchsbaum et al. |
| 7,493,624 B1* | 2/2009 | Kautzleben ......... G06F 11/3409 718/100 |

(Continued)

FOREIGN PATENT DOCUMENTS

| CN | 1512371 A | 7/2004 |
| CN | 1805379 A | 7/2006 |
| CN | 101035113 A | 9/2007 |
| CN | 102412988 A | 4/2012 |

OTHER PUBLICATIONS

Tencent Technology, ISRWO, PCT/CN2013/087369, dated Feb. 27, 2014, 8 pgs.
Tencent Technology, IPRP, PCT/CN2013/087369, dated Jun. 16, 2015, 6 pgs.

*Primary Examiner* — Suraj Joshi
(74) *Attorney, Agent, or Firm* — Morgan, Lewis & Bockius LLP (57) ABSTRACT

A method of managing servers includes at a central server having one or more processors and memory for storing one or more programs to be executed by the processors: obtaining configuration file for clustering servers; classifying each server into one layer of a hierarchical structure based on business logic associated with the server defined in the configuration file; receiving an operation command from an administrator; analyzing the operation command to identify a target server for executing the operation command; and forwarding the operation command to the target server through a path in the hierarchical structure defined in the operation command.

20 Claims, 9 Drawing Sheets

(51) Int. Cl.
  *G06F 17/30* (2006.01)
  *G06F 9/50* (2006.01)
  *H04L 29/08* (2006.01)

(52) U.S. Cl.
  CPC .. *G06F 17/30194* (2013.01); *G06F 17/30221* (2013.01); *G06F 17/30283* (2013.01); *H04L 41/042* (2013.01); *H04L 41/044* (2013.01); *H04L 67/327* (2013.01); *H04L 41/0654* (2013.01); *H04L 43/0817* (2013.01); *H04L 67/10* (2013.01)

(58) Field of Classification Search
  USPC ...................................................... 709/224
  See application file for complete search history.

(56) References Cited

U.S. PATENT DOCUMENTS

| | | |
|---|---|---|
| 7,512,707 B1 | 3/2009 | Manapragada et al. |
| 2002/0069420 A1 | 6/2002 | Russell et al. |
| 2006/0053216 A1* | 3/2006 | Deokar ............... G06F 21/6218 709/223 |

* cited by examiner

METHOD AND SYSTEM FOR MANAGING SERVERS

RELATED APPLICATIONS

This application is a continuation application of PCT Patent Application No. PCT/CN2013/087369, entitled "METHOD AND SYSTEM FOR MANAGING SERVERS" filed Nov. 19, 2013, which claims priority to Chinese Patent Application No. 201210538753.9, "METHOD AND SYSTEM FOR MANAGING SERVERS" filed Dec. 13, 2012, both of which are hereby incorporated by reference in their entirety.

FIELD OF THE INVENTION

The present application relates to the communication technical field, especially relates to a management method and device for server.

BACKGROUND OF THE INVENTION

Server is the high-performance computer in the environment of network, it intercepts the service request submitted from the other computers (client machine) on the Internet, and provides corresponding service. Therefore, server has the abilities of bearing and safeguarding service. For example, web server, it may refer to the computer used for providing website, or the software like Apache (a kind of virtual host software), which runs on such computers to manage web components and response the request of web browser.

The high performance of server mainly embodies on the aspects of high-speed arithmetic capability, long-time reliable operation and large throughput capacity of external number. The structure of server is basically similar with microcomputer, including processor, hard disk, memory, system bus and so on, they are specially established aiming at specific network application, so in the aspects of processing capacity, stability, reliability, security, extensibility, manageability, there are significant differences between server and microcomputer. Computer software for managing resources and providing service for users is divided into file server (available to help users visit files on other computers), data base server and application program server.

With the business scope becoming wider and wider, the interactive of client-side and server becomes more and more complex, the back-end server will distribute with the method of cluster according to the different business logics. After business amount and server amount reaching a certain amount layer, management server increases large burden on server administrators, the interlacement of various business logics and IDC (Internet Data Center) leads to the complex relationship among servers, hard operation and frequent error. Therefore, a set of effective technical program is required to sort out the relationships among different types of server.

SUMMARY

In accordance with some embodiments, a method of managing servers is performed at a central server having one or more processors and memory for storing one or more programs to be executed by the processors. The method includes: obtaining configuration file for clustering servers; classifying each server into one layer of a hierarchical structure based on business logic associated with the server defined in the configuration file; receiving an operation command from an administrator; analyzing the operation command to identify a target server for executing the operation command; and forwarding the operation command to the target server through a path in the hierarchical structure defined in the operation command, wherein the hierarchical structure includes at least four layers of servers configured in a tree topology from top to bottom, the four layers including: a cluster being a root node, and comprising servers that are configured to provide the same service; a plurality of groups, each group being a sub-node of the cluster, and comprising servers within the cluster that are configured with the same operation environment; a plurality of sets, each set being a sub-node of a respective group, and comprising servers within the group that have one or more sets of business; and a plurality of units, each unit being a sub-node of a respective set, and comprising servers within the set that are configured to execute the business logic associated with the set.

In accordance with some embodiments, a system of managing servers comprises: one or more processors; memory; and one or more program modules stored in the memory and to be executed by the processors, the one or more program modules further including: a configuration retrieving module configured to obtain configuration file for clustering servers, wherein the configuration file classifies each server into one layer of a hierarchical structure based on business logic associated with the server; a command analyzing module configured to receive an operation command from an administrator, and analyze the operation command to identify a target server for executing the operation command; and a command forwarding module configured to forward the operation command to the target server through a path in the hierarchical structure defined in the operation command, wherein the hierarchical structure includes at least four layers of servers configured in a tree topology from top to bottom, the four layers including: a cluster being a root node, and comprising servers that are configured to provide the same service; a plurality of groups, each group being a sub-node of the cluster, and comprising servers within the cluster that are configured with the same operation environment; a plurality of sets, each set being a sub-node of a respective group, and comprising servers within the group that have one or more sets of business; and a plurality of units, each unit being a sub-node of a respective set, and comprising servers within the set that are configured to execute the business logic associated with the set.

In accordance with some embodiments, a non-transitory computer readable storage medium stores one or more programs for execution by one or more processors of a computer system, the one or more programs including instructions for: obtaining configuration file for clustering servers; classifying each server into one layer of a hierarchical structure based on business logic associated with the server defined in the configuration file; receiving an operation command from an administrator; analyzing the operation command to identify a target server for executing the operation command; and forwarding the operation command to the target server through a path in the hierarchical structure defined in the operation command, wherein the hierarchical structure includes at least four layers of servers configured in a tree topology from top to bottom, the four layers including: a cluster being a root node, and comprising servers that are configured to provide the same service; a plurality of groups, each group being a sub-node of the cluster, and comprising servers within the cluster that are configured with the same operation environment; a plurality of sets, each set being a sub-node of a respective group, and comprising servers within the group that have one or more sets of business; and a plurality of units, each unit being a sub-node of a respective set, and comprising servers within the set that are configured to execute the business logic associated with the set.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

In order to explain the technical scheme of the embodiment of the present application more clearly, the following will briefly introduce the necessary drawings described in the embodiment, obviously, the drawings in the following description are only some embodiments of the present application, for the common technicians of this field, they can also obtain other drawings according to these drawings without any creative labor.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make a clearer understanding of purpose, technical scheme and advantages of the present application, the present application is described in detail below in combination with the attached drawings. Obviously, the described embodiment is just a part of the embodiment of the present application, not the whole one. Based on the embodiment of the present application, all the other embodiments obtained by the common technicians of this field without any creative labor shall be within the spirit and scope of the present application.

Figure 1:
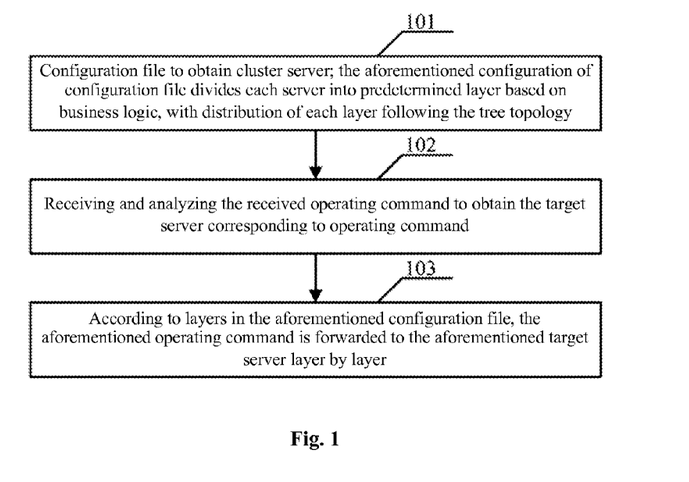
FIG. 1 is a method flowchart diagram of the embodiment of the present application.

The embodiment of the present application provides a management method of server, as shown in FIG. 1, including:

101: Configuration file to obtain cluster server; the aforementioned configuration of configuration file divides each server into predetermined layer based on business logic, with distribution of each layer following the tree topology;

The embodiment of the present application also provides examples in layers, the layers include four layers, from top to bottom they are: cluster, group, set, unit; cluster, as the root node of the highest layer, is a group of servers providing the same service, according to the operation environment of service to divide cluster, the obtained group is the child node of cluster, and set is obtained by dividing group according to different business, set is the child node of group, the child node of set is unit, unit is the execution server of executing service logic. The follow-up embodiments will give more detailed structural explanation about it. It's important to note that there may be more layers and layers can be compressed to be flatter according to different demands, the specific layer number will not be limited in the embodiment of the present application.

Furthermore, the embodiment of the present application also gives load monitoring scheme, the aforementioned method also includes: monitoring the load state of set, if the load state exceeds the predetermined threshold, send prompts that capacity expansion is required. This scheme can realize the monitoring of load, smartly remind capacity expansion.

Further, the embodiment of the present application also gives specific implementation scheme for capacity expansion, it is specially for: accept user to log in, after determining the logged-in user with the server setting up authority, pull the configuration file for cache, and add the node of specified layer to configuration file according to the user's input instruction, and distribute corresponding resources, and then start up the server corresponding to the added node and business logic.

Preferably, in the aforementioned layers, the servers at the bottom layer are host and standby to each other, one or more servers at the bottom layer are set in a physical server. If there is more than one server set in a physical server, the physical server with free resource can be effectively utilized.

Further, because the servers at the bottom layer are host and standby to each other, the embodiment of the present application also gives the solution for server fault: monitoring the state of the servers at the bottom layer, after the servers at the bottom layer emerging fault, prompt to remove the servers with fault at the bottom layer, use the brother node server of the servers with fault at the bottom layer to execute the business logic of the aforementioned servers with fault at the bottom layer. Because the servers at the bottom layer are host and standby to each other, the removal of the servers at the bottom layer will not affect providing service for customers, therefore, even the servers at the bottom layer emerges fault, the user experience will not be affected, and it will realize smooth fault handling.

102: Receiving and analyzing the received operating command to obtain target server corresponding to operating instruction;

Preferably, the aforementioned receiving and analyzing the received operating command includes: receive the operating command through the visual operating interface presented for users, and analyze the received operating command. There are many schemes of receiving the operating command through the visual operating interface presented for users, for example, use UI (User Interface) figure operating mode to receive the operating command. No matter what kind of visual operating interface is specifically adopted, the realization of the embodiment of the present application will not be affected and the embodiment of the present application will not limit it.

103: According to layers in the aforementioned configuration file, the aforementioned operating command is forwarded to the aforementioned target server layer by layer.

Through the layer-management to server, the above schemes make the logical relationship among servers be easier, therefore, effective method is provided to sort out the complex relationships among servers.

Optionally, the aforementioned according to layers in the aforementioned configuration file, the aforementioned operating command is forwarded to the aforementioned target server layer by layer includes: if the layer corresponding to the aforementioned target server is not the bottom layer, the sub tree that uses the server of the layer corresponding to the aforementioned target server as root node will be used as the unit of the target server, according to layers in the aforementioned configuration file, the aforementioned operating command is forwarded to the unit of the aforementioned target server layer by layer. In addition, understandably, if the target server is the server at bottom layer, directly execute: according to layers in the aforementioned configuration file, the aforementioned operating command is forwarded to the aforementioned target server layer by layer.

In the follow-up embodiment, the layer structure submitted in the embodiment method of the present application will be given examples to explain, and the realization of various functions will be given examples to explain specifically, as follows:

I. Server Layer

Figure 2:
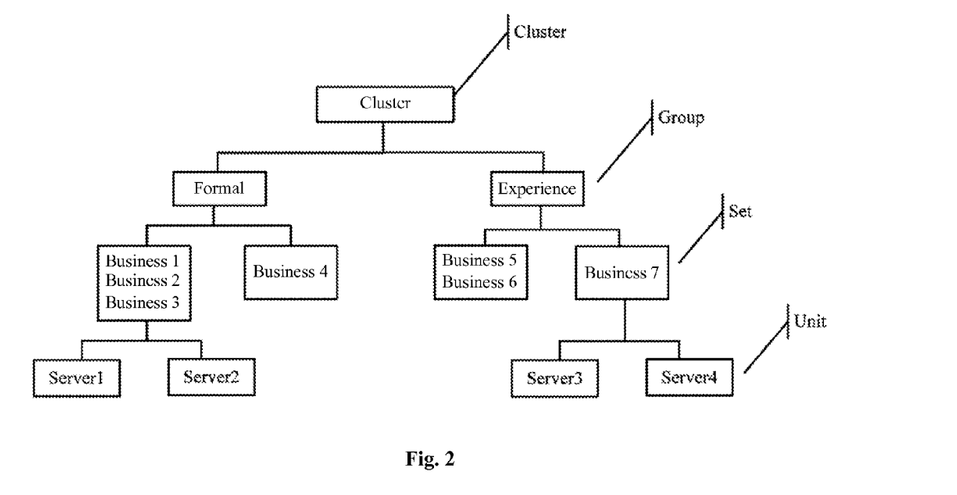
FIG. 2 is a schematic diagram of layer structure of the embodiment of the present application.

Refer to FIG. 2, according to business logic, server cluster can be divided into four layers of cluster, group, set and unit. Unit is the smallest management unit. Topological relation is shown in the following figure:

Define a group of servers providing the same service as cluster, under the same cluster, according to the operation mode of the company, abstract out the different group, for example, games can be divided into formal server, experience server, test server and so on. Under each specific group, separate out different sets by using business as classification standard, there can be one business in each set, or more than one business, for the small business, many businesses can commonly use a set, for the business with large amount of users, it can monopolize one set, manager can determine the classification standard according to business scale; for example, Business 1-Business 7 in FIG. 2. The child node in each set is the smallest management unit server of the current server, generally, there are many different IDC servers distributed under each set, such as Server 1-Server 4.

The layer of the above topological structure and the relationship of each layer are stored in the configuration file, the concept of the above server of each layer can be logical server concept, and the distribution in the physical server will not be limited in the embodiment of the present application. Several examples will be given in the follow-up embodiment.

II. Forwarding of Command

Figure 3:
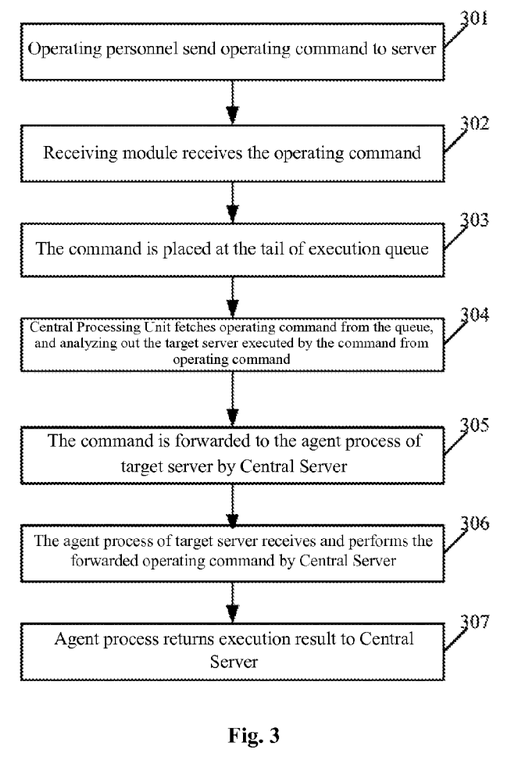
FIG. 3 is a method flowchart diagram of the embodiment of the present application.

Agent on each server is used for forwarding and executing the commands sent by central management server (server in management position), all of the four layers of cluster, group, set and unit can abstract out the same command to carry out same operations to the current node and brother node, child node. For example, group layer can be abstracted out update operation, use group as unit update server. In the set layer, aim at each business, abstract out startup, stop, load configuration and other operations. An example is given below, as shown in FIG. 3, including:

301: Operating personnel send operating command to server;

302: Receiving module receives the operating command;

303: The command is placed at the tail of execution queue;

304: Central Processing Unit fetches operating command from the queue, and analyzes out the target server executed by the command from operating command;

305: The command is forwarded to agent process of target server by Central Server;

306: The agent process of target server receives and performs the forwarded operating command by Central Server;

307: Agent process returns execution result to Central Server.

III. The Application of Central Server

Figure 4:
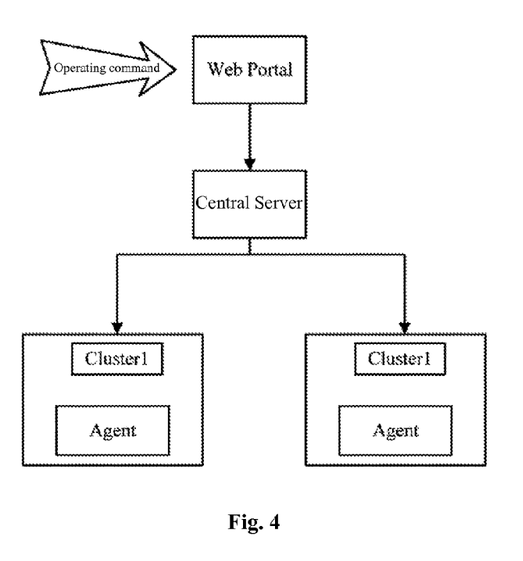
FIG. 4 is a method flowchart diagram of the embodiment of the present application.

A Central Server can be set to manage the numerous clusters. In specific: use some friendly, simple UI (User Interface) figure operating mode to operate Central Server, so as to realize the purpose of managing cluster. In the products applied by the embodiment of the present application, the server manager of the platform can use the mode of web portal to operate Central Server; as shown in FIG. 4, user sends the operating command to Central Server through web portal, and Central Server sends operating command to different clusters, cluster 1 and/or cluster 2, enters into the agent of cluster.

IV. Server Backup

For each server under each set, all servers can be the same one, and they can provide the same service, be host and standby to each other, for example, 10 servers are distributed under set 1, set 1 includes two businesses, and then both of the two businesses have service logic in the 10 servers of this set, for a business, the 10 servers are host and standby to each other, and backups for each other. In a set, the more businesses are, the higher the utilization ratio of server is.

V. Monitoring of the Server Capacity Expansion

In the framework of the deployment structure of the above servers, realizing the smooth capacity expansion of server will not affect the other parallel businesses, specifically as follows: for each set, we can weigh the maximum capacity of each set according to quantifiable index, such as CPU (Central Processing Unit) of current server, the number of send-receive packet of network card, memory size, the busyness of server process, and show the reached load currently in the monitoring system, manager can decide whether to carry out capacity expansion for server according to the current capacity of set.

VI. Capacity Expansion of Server

Figure 5:
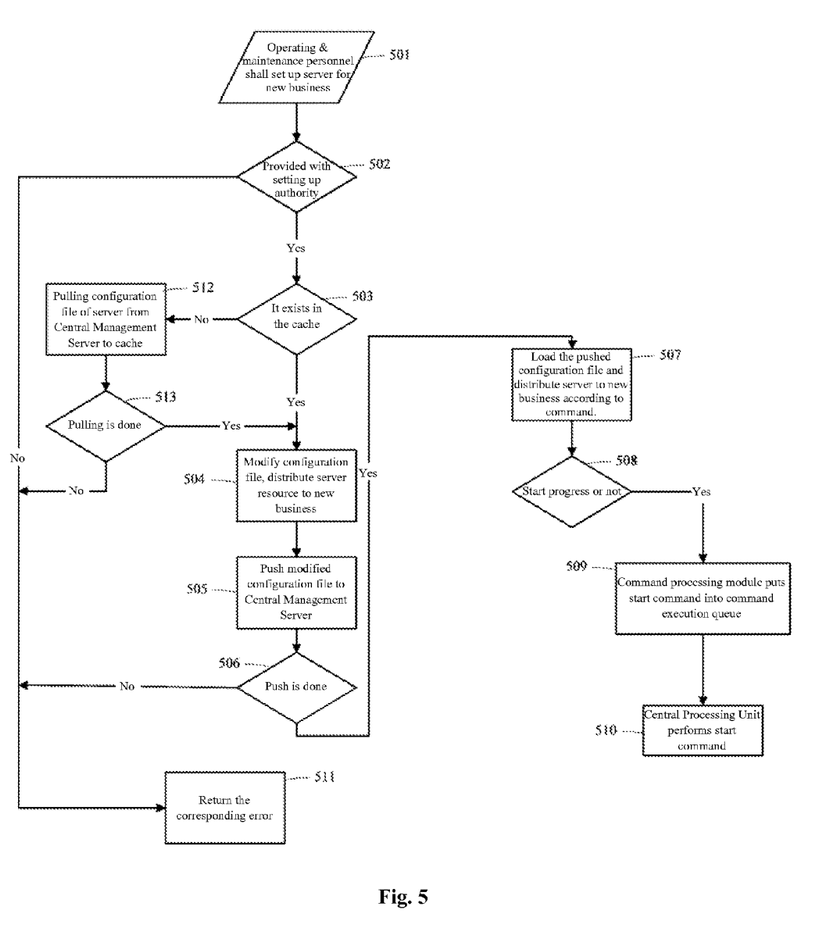
FIG. 5 is a method flowchart diagram of the embodiment of the present application.

If administrator decides to conduct capacity expansion, at first, select the appropriate Set corresponding to Group, followed by conducting the operation of capacity expansion of server based on guide of web portal. The following provides an example, as shown in FIG. 5, including:

501: Operating & maintenance personnel shall set up server for new business, call setting up business interface for logging;

502: To judge whether setting up authority is provided, if it is Yes, enter 503, if not, enter 511;

503: To determine whether server information configuration exists in cache, and the configuration information can be included in configuration file, if it is Yes, enter 504, if not, enter 512;

504: Modify configuration file, server resource is distributed to new business, and incorporated into management scope of central server;

505: Push modified configuration file to Central Management Server;

506: To determine whether pulling is done, if it is Yes, enter 507, if not, enter 511;

507: Central Management Server loads the pushed configuration file and distribute server to new business according to command;

508: To determine whether starting new business server progress, if it is Yes, enter 509, if not, back to results and end progress;

509: Command processing module puts start command into command execution queue;

510: Central Processing Unit performs start command.

511: Return the corresponding error; process ends.

512: Pulling configuration file of server from Central Management Server to cache;

513: To determine whether pulling is done, if it is Yes, enter 504, if not, enter 512.

VII. Centralized Deployment

The use of centralized deployment reduces expenses of server. As in conventional mode, server is distributed by scattered mode. Each server only provides single service aimed at a certain business. It may cause a great waste for certain server with very light business load, adopting project management server of the embodiment of the present application, using server resource with capacity of each set as standard, under each set, when one set of server provided with enough resource is required to set up multiple unit on the same physical server, therefore, expenses of server will be reduced to the largest extent. Application test of application product in the embodiment of the present application: there are 40 businesses using server for the Interaction Entertainment, according to conventional deployment mode, a business needing 4 sets of servers based on IDC deployment, 40 businesses needing 160 sets of servers. However, among these 160 sets of servers, business of 50% nearly are not fully utilized as a result of small number of users, after the embodiment of the present application is used for prevention, we allocate multiple businesses with small number of users to one set, and this set takes capacity as standard, allowing multiple businesses to share a set physical server. When load of set reaches 80%, and consideration will be given for capacity expansion of new set for the purpose of reducing business pressure. After the implementation of this scheme, 50% of server cost at least is reduced for the company.

VIII. Fault Handling

When fault server exists, fault can be obtained through detection followed by sending warning to prompt the administrator. At this moment, allowing administrator to remove fault machine from set. As all servers of each set are identical, with servers acting as mutual host and backup, when one set of server fails, client-side is not aware of this fault, having no effect on business basically, if load of the rest servers is too large after removal, conducting capacity expansion of server, refer to content above for the detailed capacity expansion scheme.

Figure 6:
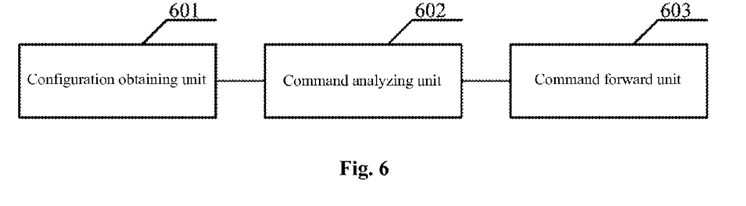
FIG. 6 is a structural schematic diagram of device of the embodiment of the present application.

The embodiment of the present application also provides a kind of management device of server, as shown in FIG. 6, including:

Configuration obtaining unit 601, configured to obtain the configuration file of cluster server; the aforementioned configuration of configuration file divides each server into predetermined layer based on business logic, with distribution of each layer following the tree topology;

Command analyzing unit 602, configured to receive and analyze operating command to obtain the target server corresponding to operating command;

Command forward unit 603, configured to forward the aforementioned operating command to the aforementioned target server layer by layer according to layers in the aforementioned configuration file.

Through the layer-management to server, the above schemes make the logical relationship among servers be easier, therefore, effective method is provided to sort out the complex relationships among servers.

Preferably, the embodiment of the present application also provides examples of layers, and the aforementioned configuration obtaining unit 601 is configured specifically to obtain configuration file of cluster server; the aforementioned configuration of configuration file divides each server into predetermined layer based on business logic, with distribution of each layer following the tree topology; the layers include four layers, from top to bottom they are: cluster, group, set, unit; cluster, as the root node of the highest layer, is a group of servers providing the same service, according to the operation environment of service to divide cluster, the obtained group is the child node of cluster, and set is obtained by dividing group according to different business, set is the child node of group, the child node of set is unit, unit is the execution server of executing service logic. It's important to note that there may be more layers and layers can be compressed to be flatter according to different demands, the specific layer number will not be limited in the embodiment of the present application.

Figure 7:
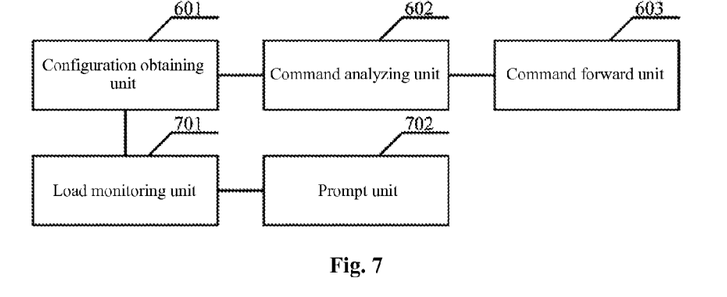
FIG. 7 is a structural schematic diagram of device of the embodiment of the present application.

Furthermore, the embodiment of the present application also provides load monitoring scheme, as shown in FIG. 7, and the aforementioned device also includes:

Load monitoring unit 701, configured to monitor the load state of set;

Prompt unit 702, configured to send prompt of the need for capacity expansion when load monitoring unit 701 monitors load state exceeding the predetermined threshold.

Figure 8:
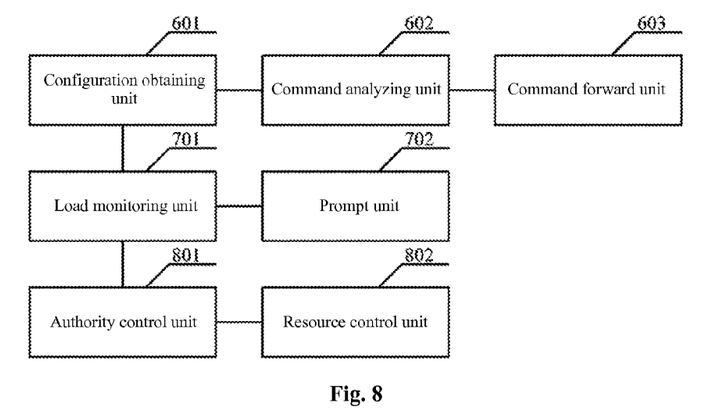
FIG. 8 is a structural schematic diagram of device of the embodiment of the present application.

Furthermore, the embodiment of the present application also provides specific execution scheme of capacity expansion, as shown in FIG. 8, and the aforementioned device also includes:

Authority control unit 801, configured to receive logging of users, to determine whether logged-in users is provided with the server setting up authority;

Resource control unit 803, configured to pull the configuration file for cache after determining the logged-in user with the server setting up authority in authority control unit 801, and add the node of specified layer to configuration file according to the user's input instruction, and distribute corresponding resources, and then start up the server corresponding to the added node and business logic.

Preferably, in the aforementioned layers, the servers at the bottom layer are host and standby to each other, one or more servers at the bottom layer are set in a physical server. If there is more than one server set in a physical server, the physical server with free resource can be effectively utilized.

Figure 9:
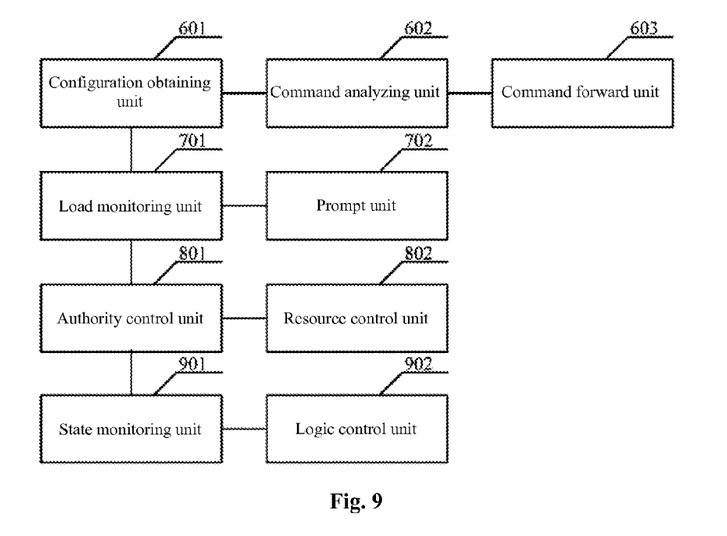
FIG. 9 is a structural schematic diagram of device of the embodiment of the present application.

Further, because the servers at the bottom layer are host and standby to each other, the embodiment of the present application also gives the solution for server fault: As shown in FIG. 9, the aforementioned device also includes:

State monitoring unit 901, configured to monitor the state of server at the bottom layer;

Logic control unit 902, configured to prompt to remove the servers with problems at the bottom layer after determining the servers at the bottom layer emerging problems by the state monitoring unit 901, to use the brother node server of the servers with problems at the bottom layer to execute the business logic of the aforementioned servers with problem at the bottom layer.

Because the servers at the bottom layer are host and standby to each other, the removal of the servers at the bottom layer will not affect providing service for customers, therefore, even the servers at the bottom layer emerges fault, the user experience will not be affected, and it will realize smooth fault handling.

Optionally, command forward unit 603 is configured for: if the layer corresponding to the aforementioned target server is not the bottom layer, the sub tree that uses the server of the layer corresponding to the aforementioned target server as root node will be used as the unit of the target server, according to layers in the aforementioned configuration file, the aforementioned operating command is forwarded to the unit of the aforementioned target server layer by layer. In addition, understandably, if the target server is the server at bottom layer, directly execute: according to layers in the aforementioned configuration file, the aforementioned operating command is forwarded to the aforementioned target server layer by layer.

Optionally, command analyzing unit 602 is configured to receive the operating command through the visual operating interface presented for users, and analyze the received operating command. There are many schemes of receiving the operating command through the visual operating interface presented for users, for example, use UI (User Interface) figure operating mode to receive the operating command. No matter what kind of visual operating interface is specifically adopted, the realization of the embodiment of the present application will not be affected, the embodiment of the present application will not limit it.

Figure 10:
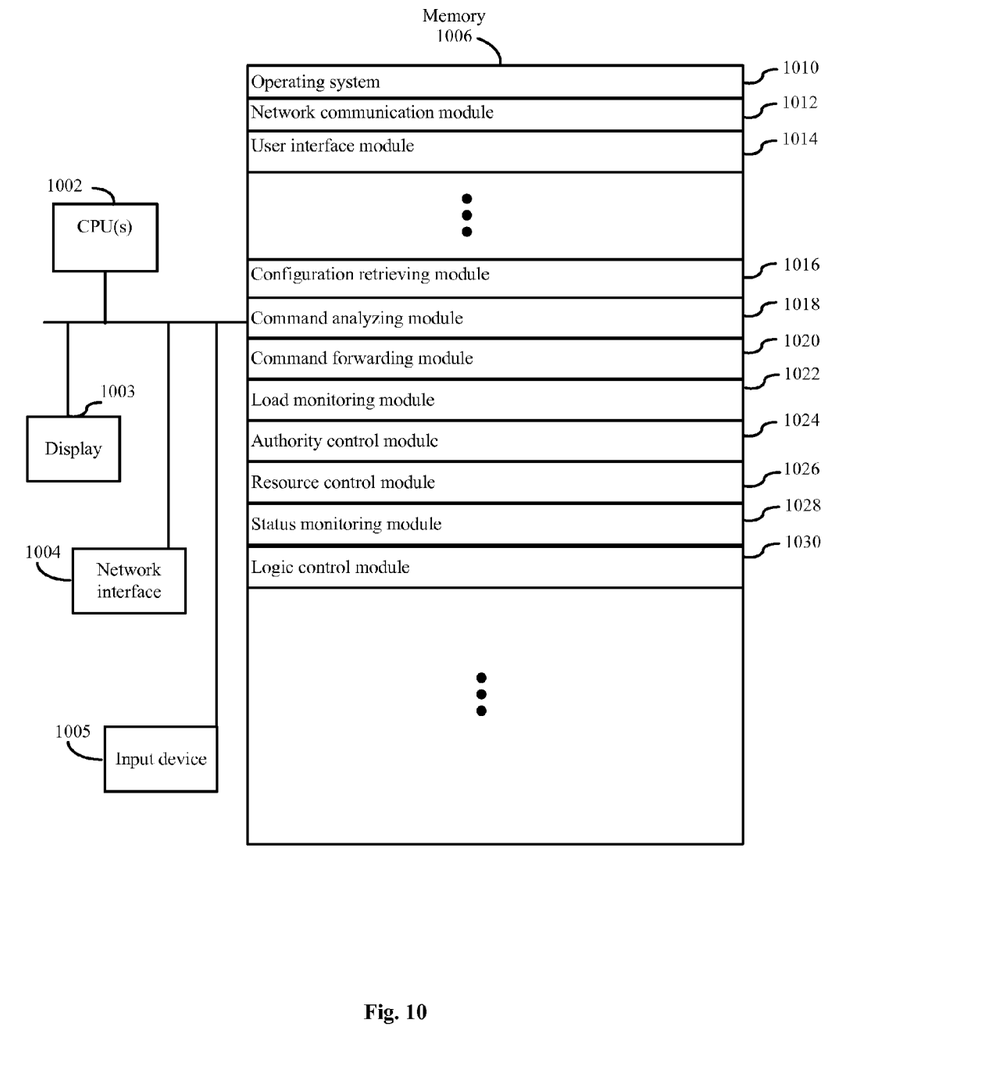
FIG. 10 is a computer diagram of the system of managing servers in accordance to some embodiments of the present application.

FIG. 10 is a computer diagram of the system of managing servers in accordance to some embodiments of the present application. The system of managing servers comprises CPU(s) 1002, a display 1003, a network interface 1004, an input device 1005, a memory 1006, an operation system 1010, a network communication module 1012, a user interface module 1014, a configuration retrieving module 1016 configured to obtain configuration file for clustering servers, wherein the configuration file classifies each server into one layer of a hierarchical structure based on business logic associated with the server, a command analyzing module 1018 configured to receive an operation command from an administrator, and analyze the operation command to identify a target server for executing the operation command, a command forwarding module 1020 configured to forward the operation command to the target server through a path in the hierarchical structure defined in the operation command, a load monitoring module 1022 configured to monitor load status of the set, and if the load status exceeds a pre-determined threshold, send a warning that a capacity expansion is necessary, an authority control module 1024 configured to accept a user log in, and verify whether a logged-in user has an authority to configure the clustering servers, a resource control module 1026 configured to pull the configuration file to cache, modify the configuration file by adding a node to a designated layer of the hierarchical structure in accordance to user input, allocate corresponding resources, and start the server and business logic that corresponds to the added node if the logged-in user has the authority to configure the clustering servers, a status monitoring module 1028 configured to monitor status of a server at the bottom layer of the hierarchical structure; and if the status of the server indicates malfunctioning, and a logic control module 1030 configured to instruct to remove the malfunctioned server and use a back-up server to execute the business logic of the malfunctioned server.

In some embodiments, the hierarchical structure includes at least four layers of servers configured in a tree topology from top to bottom, the four layers including: a cluster being a root node, and comprising servers that are configured to provide the same service; a plurality of groups, each group being a sub-node of the cluster, and comprising servers within the cluster that are configured with the same operation environment; a plurality of sets, each set being a sub-node of a respective group, and comprising servers within the group that have one or more sets of business; and a plurality of units, each unit being a sub-node of a respective set, and comprising servers within the set that are configured to execute the business logic associated with the set.

Figure 11:
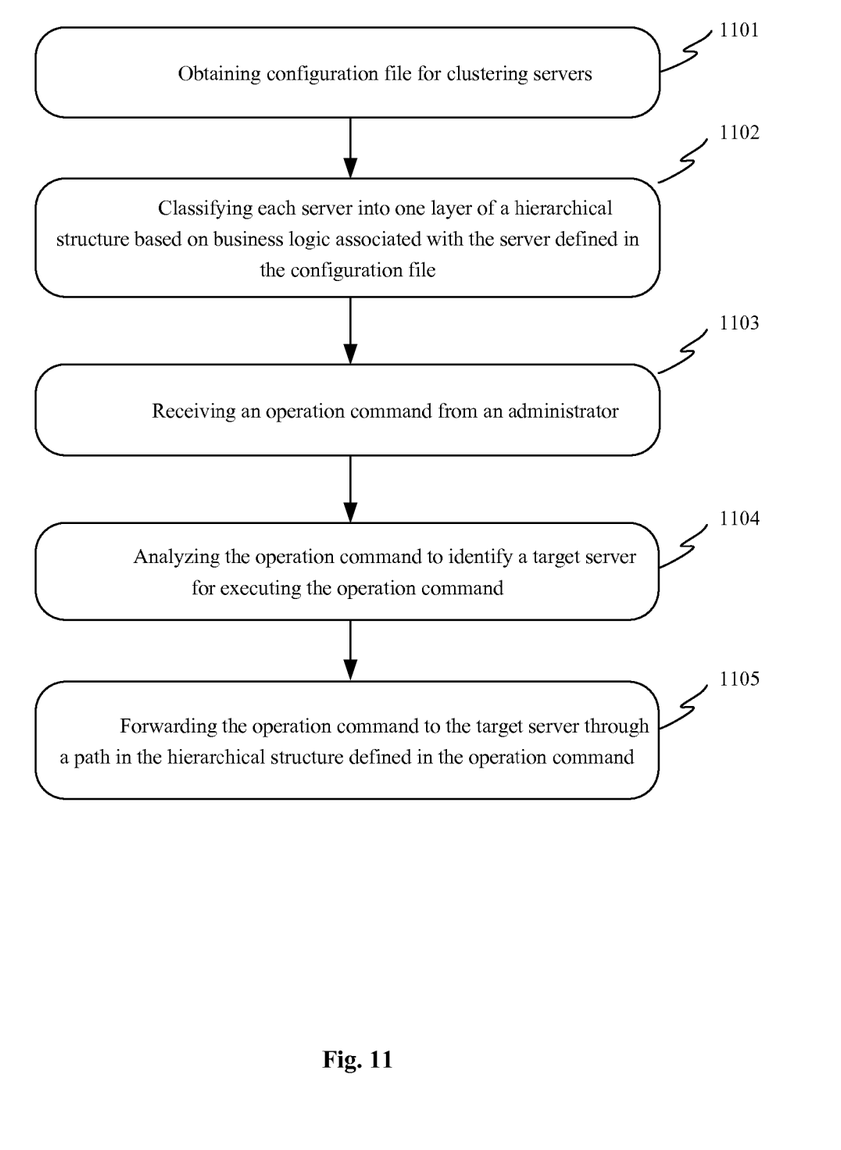
FIG. 11 is a flow chart of the method of managing servers in accordance to some embodiments of the present application.

FIG. 11 is a flow chart of the method of managing servers in accordance to some embodiments of the present application. The method of managing servers comprises at a central server having one or more processors and memory for storing one or more programs to be executed by the processors: obtaining configuration file for clustering servers 1101; classifying each server into one layer of a hierarchical structure based on business logic associated with the server defined in the configuration file 1102; receiving an operation command from an administrator 1103; analyzing the operation command to identify a target server for executing the operation command 1104; and forwarding the operation command to the target server through a path in the hierarchical structure defined in the operation command 1105.

Figure 12:
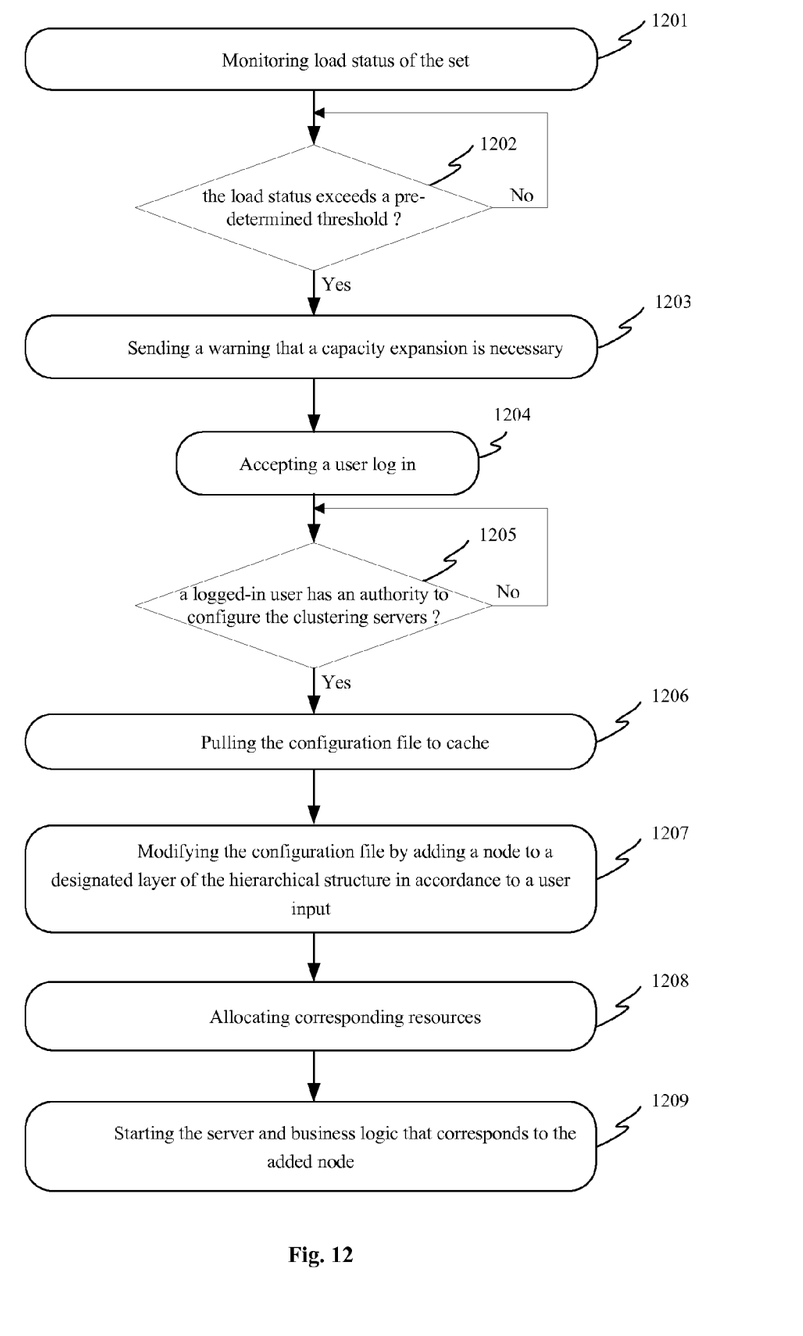
FIG. 12 is yet another flow chart of the method of managing servers in accordance to some embodiments of the present application.

FIG. 12 is yet another flow chart of the method of managing servers in accordance to some embodiments of the present application. The method of managing servers further comprises monitoring load status of the set 1201, determining whether the load status exceeds a pre-determined threshold 1202, if yes, sending a warning that a capacity expansion is necessary 1203, accepting a user log in 1204, and determining whether a logged-in user has an authority to configure the clustering servers 1205; if yes, pulling the configuration file to cache 1206, modifying the configuration file by adding a node to a designated layer of the hierarchical structure in accordance to a user input 1207, allocating corresponding resources 1208, and starting the server and business logic that corresponds to the added node 1209.

Figure 13:
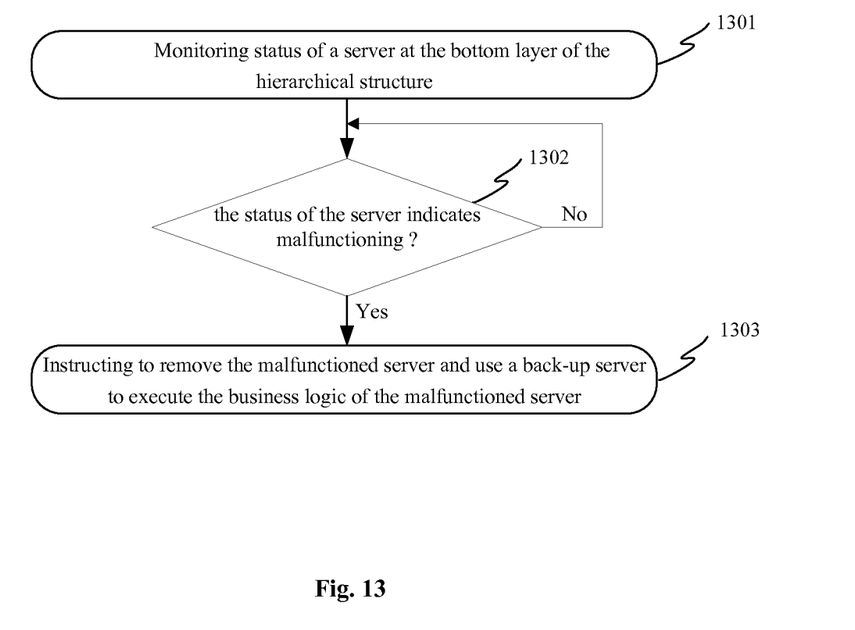
FIG. 13 is yet another flow chart of the method of managing servers in accordance to some embodiments of the present application.

FIG. 13 is yet another flow chart of the method of managing servers in accordance to some embodiments of the present application. The method of managing servers further comprises monitoring status of a server at the bottom layer of the hierarchical structure 1301, determining whether the status of the server indicates malfunctioning 1302, if yes, instructing to remove the malfunctioned server and use a back-up server to execute the business logic of the malfunctioned server 1303.

Figure 14:
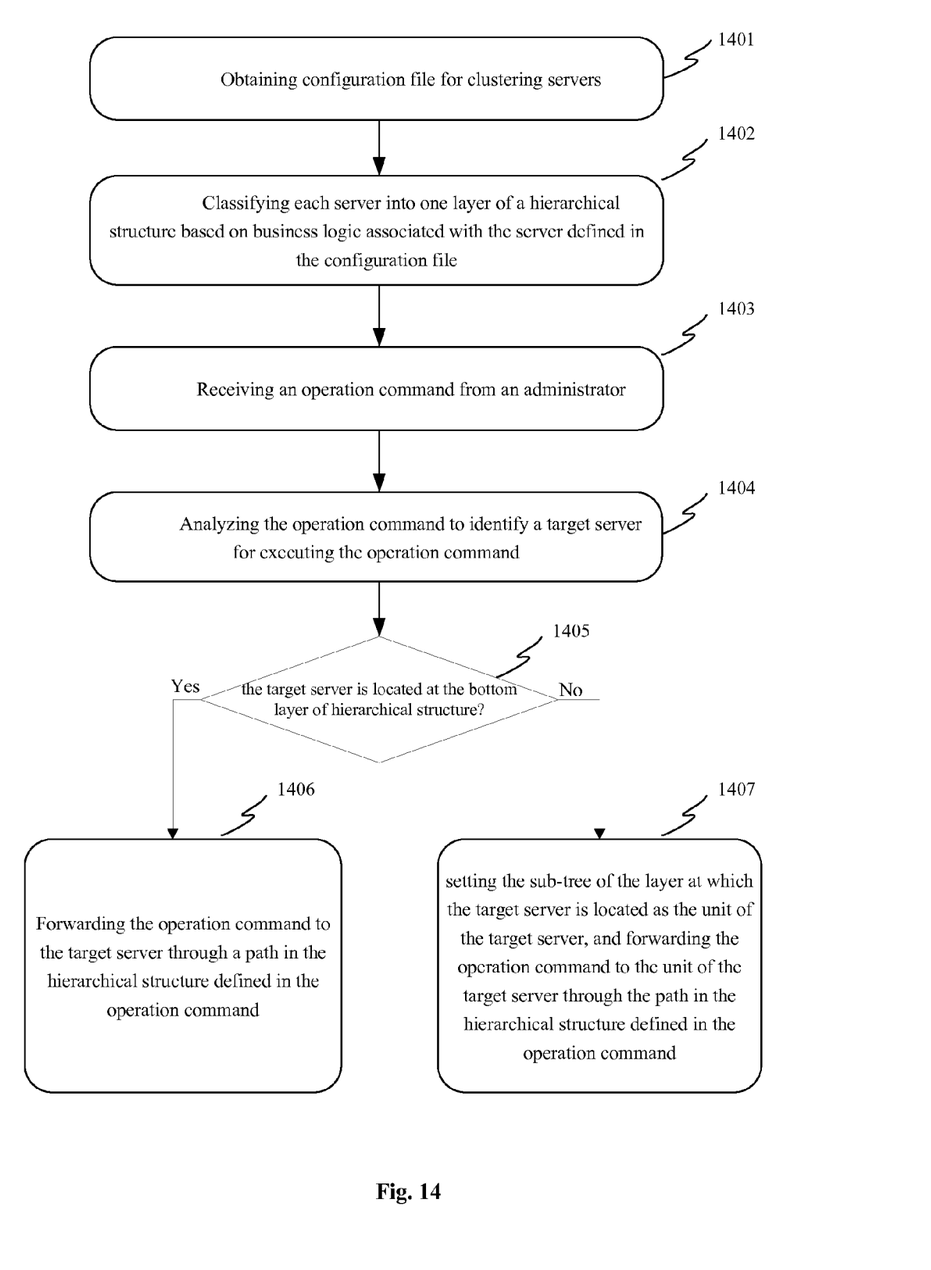
FIG. 14 is yet another flow chart of the method of managing servers in accordance to some embodiments of the present application.

FIG. 14 is yet another flow chart of the method of managing servers in accordance to some embodiments of the present application. The method of managing servers comprises at a central server having one or more processors and memory for storing one or more programs to be executed by the processors: obtaining configuration file for clustering servers 1401; classifying each server into one layer of a hierarchical structure based on business logic associated with the server defined in the configuration file 1402; receiving an operation command from an administrator 1403; analyzing the operation command to identify a target server for executing the operation command 1404; determining whether the target server is located at the bottom layer of hierarchical structure 1405; if yes, forwarding the operation command to the target server through a path in the hierarchical structure defined in the operation command 1406, and if no, setting the sub-tree of the layer at which the target server is located as the unit of the target server, and forwarding the operation command to the unit of the target server through the path in the hierarchical structure defined in the operation command.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of managing servers comprising:
    at a central server having one or more processors and memory for storing one or more programs to be executed by the processors:
    obtaining configuration file for clustering servers;
    classifying each server into one layer of a hierarchical structure based on business logic associated with the server defined in the configuration file;
    receiving an operation command from an administrator;
    analyzing the operation command to identify a target server for executing the operation command; and
    forwarding the operation command to the target server through a path in the hierarchical structure defined in the operation command, wherein the hierarchical structure includes at least four layers of servers configured in a tree topology from top to bottom, the four layers including:
        a cluster being a root node, and comprising servers that are configured to provide the same service;
        a plurality of groups, each group being a sub-node of the cluster, and comprising servers within the cluster that are configured with the same operation environment;
        a plurality of sets, each set being a sub-node of a respective group, and comprising servers within the group that have one or more sets of business wherein each set has a symmetric configuration such that each server in the set is installed with one and only one set of identical business logic and any one server in the set is a host, a standby, and a backup to any other server in the same set; and
        a plurality of units, each unit being a sub-node of a respective set, and comprising servers within the set that are configured to execute the business logic associated with the set.

2. The method of managing servers according to claim 1, further comprises:
    monitoring load status of the set, and if the load status exceeds a pre-determined threshold, sending a warning that a capacity expansion is necessary.

3. The method of managing servers according to claim 1, further comprises:
    expanding the capacity of the clustering servers including:
        accepting a user log in, and verifying whether a logged-in user has an authority to configure the clustering servers; and if the logged-in user has the authority to configure the clustering servers, pulling the configuration file to cache, modifying the configuration file by adding a node to a designated layer of the hierarchical structure in accordance to a user input, allocating corresponding resources, and starting the server and business logic that corresponds to the added node.

4. The method of managing servers according to claim 1, wherein
the servers at the bottom layer of the hierarchical structure are configured to operate as back-up to each other, and
at least one server at the bottom layer of the hierarchical structure is configured in a substance server.

5. The method of managing servers according to claim 4, further comprises:
monitoring status of a server at the bottom layer of the hierarchical structure, and if the status of the server indicates malfunctioning, instructing to remove the malfunctioned server and use a back-up server to execute the business logic of the malfunctioned server.

6. The method of managing servers according to claim 1, wherein forwarding the operation command to the target server through a path in the hierarchical structure defined in the operation command further comprises:
if the target server is not located at the bottom layer of the hierarchical structure, setting the sub-tree of the layer at which the target server is located as the unit of the target server, and
forwarding the operation command to the unit of the target server through the path in the hierarchical structure defined in the operation command.

7. The method of managing servers according to claim 1, wherein analyzing the operation command to identify a target server for executing the operation command further comprises:
receiving the operation command via a visual operation interface presented to users, and analyzing the operation command.

8. A system of managing servers comprising:
one or more processors;
memory; and
one or more program modules stored in the memory and to be executed by the processors, the one or more program modules further including:
a configuration retrieving module configured to obtain configuration file for clustering servers, wherein the configuration file classifies each server into one layer of a hierarchical structure based on business logic associated with the server;
a command analyzing module configured to receive an operation command from an administrator, and analyze the operation command to identify a target server for executing the operation command; and
a command forwarding module configured to forward the operation command to the target server through a path in the hierarchical structure defined in the operation command, wherein the hierarchical structure includes at least four layers of servers configured in a tree topology from top to bottom, the four layers including:
a cluster being a root node, and comprising servers that are configured to provide the same service;
a plurality of groups, each group being a sub-node of the cluster, and comprising servers within the cluster that are configured with the same operation environment;
a plurality of sets, each set being a sub-node of a respective group, and comprising servers within the group that have one or more sets of business wherein each set has a symmetric configuration such that each server in the set is installed with one and only one set of identical business logic and any one server in the set is a host, a standby, and a backup to any other server in the same set; and
a plurality of units, each unit being a sub-node of a respective set, and comprising servers within the set that are configured to execute the business logic associated with the set.

9. The system of managing servers according to claim 8, further comprises:
a load monitoring module configured to monitor load status of the set, and if the load status exceeds a pre-determined threshold, send a warning that a capacity expansion is necessary.

10. The system of managing servers according to claim 9, further comprises:
an authority control module configured to accept a user log in, and verify whether a logged-in user has an authority to configure the clustering servers; and
a resource control module configured to pull the configuration file to cache, modify the configuration file by adding a node to a designated layer of the hierarchical structure in accordance to user input, allocate corresponding resources, and start the server and business logic that corresponds to the added node if the logged-in user has the authority to configure the clustering servers.

11. The system of managing servers according to claim 8, wherein
the servers at the bottom layer of the hierarchical structure are configured as back-up to each other, and
at least one server at the bottom layer of the hierarchical structure is configured in a substance server.

12. The system of managing servers according to claim 11 further comprises:
a status monitoring module configured to monitor status of a server at the bottom layer of the hierarchical structure; and if the status of the server indicates malfunctioning, and
a logic control module configured to instruct to remove the malfunctioned server and use a back-up server to execute the business logic of the malfunctioned server.

13. The system of managing servers according to claim 8, wherein
the command forwarding module is further configured to determine whether the target server is located at the bottom layer of hierarchical structure, and if the target server is not located at the bottom layer of the hierarchical structure, set the sub-tree of the layer at which the target server is located as the unit of the target server, and forward the operation command to the unit of the target server through the path in the hierarchical structure defined in the operation command.

14. The system of managing servers according to claim 8, wherein
the command analyzing module is further configured to receive the operation command via a visual operation interface presented to users, and analyze the operation command.

15. A non-transitory computer readable storage medium, storing one or more programs for execution by one or more processors of a computer system, the one or more programs including instructions for:

obtaining configuration file for clustering servers;
classifying each server into one layer of a hierarchical structure based on business logic associated with the server defined in the configuration file;
receiving an operation command from an administrator;
analyzing the operation command to identify a target server for executing the operation command; and
forwarding the operation command to the target server through a path in the hierarchical structure defined in the operation command, wherein the hierarchical structure includes at least four layers of servers configured in a tree topology from top to bottom, the four layers including:
  a cluster being a root node, and comprising servers that are configured to provide the same service;
  a plurality of groups, each group being a sub-node of the cluster, and comprising servers within the cluster that are configured with the same operation environment;
  a plurality of sets, each set being a sub-node of a respective group, and comprising servers within the group that have one or more sets of business wherein each set has a symmetric configuration such that each server in the set is installed with one and only one set of identical business logic and any one server in the set is a host, standby, and a backup to any other server in the same set; and
  a plurality of units, each unit being a sub-node of a respective set, and comprising servers within the set that are configured to execute the business logic associated with the set.

16. The non-transitory computer readable storage medium according to claim 15, wherein the one or more programs further include instructions for:
monitoring load status of the set, and if the load status exceeds a pre-determined threshold, sending a warning that a capacity expansion is necessary.

17. The non-transitory computer readable storage medium according to claim 16, wherein the one or more programs further include instructions for:
expanding the capacity of the clustering servers including:
  accepting a user log in, and verifying whether a logged-in user has an authority to configure the clustering servers; and
  if the logged-in user has the authority to configure the clustering servers, pulling the configuration file to cache, modifying the configuration file by adding a node to a designated layer of the hierarchical structure in accordance to a user input, allocating corresponding resources, and starting the server and business logic that corresponds to the added node.

18. The non-transitory computer readable storage medium according to claim 15, wherein
the servers at the bottom layer of the hierarchical structure are configured to operate as back-up to each other, and
at least one server at the bottom layer of the hierarchical structure is configured in a substance server.

19. The non-transitory computer readable storage medium according to claim 18, wherein the one or more programs further include instructions for:
monitoring status of a server at the bottom layer of the hierarchical structure, and if the status of the server indicates malfunctioning, instructing to remove the malfunctioned server and use a back-up server to execute the business logic of the malfunctioned server.

20. The non-transitory computer readable storage medium according to claim 15, wherein the instruction for forwarding the operation command to the target server through a path in the hierarchical structure defined in the operation command further comprises instructions for:
if the target server is not located at the bottom layer of the hierarchical structure, setting the sub-tree of the layer at which the target server is located as the unit of the target server, and
forwarding the operation command to the unit of the target server through the path in the hierarchical structure defined in the operation command.

\* \* \* \* \*